I. J. WEBBER.
Car Brake.

No. 17,763.

2 Sheets—Sheet 1.

Patented July 7, 1857.

I. J. WEBBER.
Car Brake.

No. 17,763.

2 Sheets—Sheet 2.

Patented July 7, 1857.

UNITED STATES PATENT OFFICE.

IRA J. WEBBER, OF SALEM, MASSACHUSETTS.

METHOD OF APPLYING RAILROAD-CAR BRAKES.

Specification of Letters Patent No. 17,763, dated July 7, 1857.

*To all whom it may concern:*

Be it known that I, IRA J. WEBBER, of Salem, in the county of Essex and State of Massachusetts, have invented a certain new and Improved Method of Applying Car-Brakes, of which the following is a full, clear, and exact description, reference being had to the accompanying drawings, making part of this specification, in which—

Figure 3:
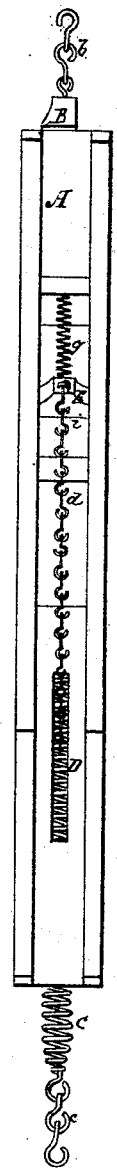
Figure 2:
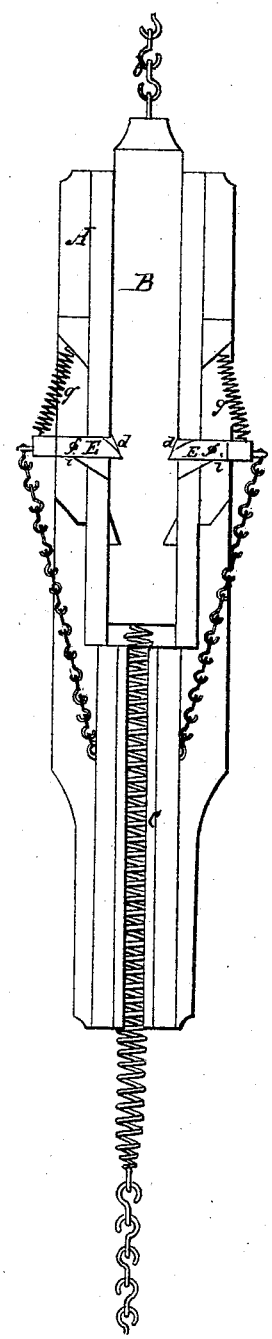
Figure 1:
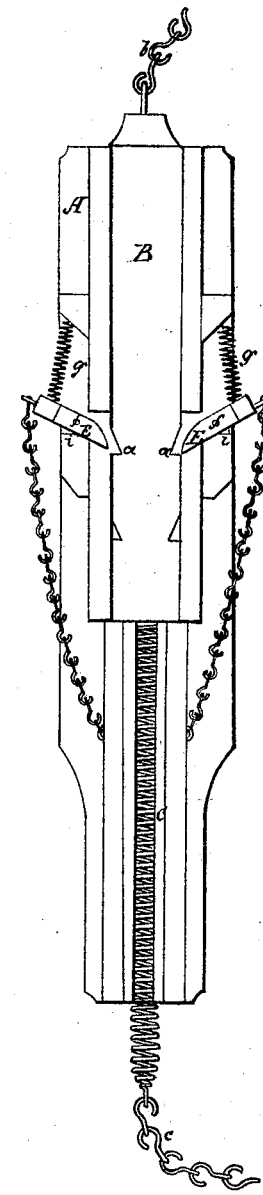

Figures 1 and 2 are plans. Fig. 3, a side view.

My invention consists in an apparatus for the purpose of operating the brakes of railroad cars, whereby the brakeman is enabled to apply the brakes of all the cars of the train by putting on the brakes of the hindmost car, as will now be more particularly described.

A is a block which is attached to the under side of the car near its end. In this block slides a bolt B having notches $a$ cut in its sides. To one end of this bolt is attached a chain $b$, the other end of which is fastened to the brake lever of the car next preceding the one to which this apparatus is attached. To the other end of the bolt B is attached a spiral-coiled wire C, which moves in a recess formed longitudinally in the block A. To the end of this wire, which projects from the end of the block A, is attached a chain $c$.

D, Fig. 3, are slots cut through the sides of the block A, one on each side through which pass the small chains $d$, which are attached to the wire C. The other ends of the chains $d$ are attached to the dogs E. These dogs are pivoted to the block A at $f$, one on each side, and play in recesses in the block. When not operated upon by the chains $d$ they are held in the position shown in Fig. 1 by the spiral springs $g$. In order that the motion of the hind brake lever may be communicated to the chains $d$ before too much of the wire C has been drawn out, this wire is made lighter or weaker at its inner end than at the other.

Operation: The block or frame A is attached to the under side of the car body near its forward end, the chain $b$ being fastened to the brake lever of the car next preceding, the chain $c$ being attached to the brake lever of the rear truck of its own car. This arrangement is continued throughout the whole train. Thus, when the brakes are applied to the rear car by the brakeman the chain $c$ is retracted and with it the spiral C and chains $d$. These pull on the outer ends of the dogs E against the resistance of the springs $g$ and throw them into the position seen in Fig. 2, their inner ends catching in the notches $a$ and locking the bolt B so that it cannot be drawn out by the chain $b$, the dogs E resting against the shoulder $i$ in the side of the block A. The bolt B, now being locked and prevented from playing back and forth as the cars are separated (as it does when the dogs E are in the position of Fig. 1), the rear car being checked by its brakes, will pull on the chain $b$ and apply the brakes of the car next in advance in the train, and by the same arrangement as number 2 is checked, the brakes are applied to number 3 and so on throughout the whole train.

In order that the cars may be run either end foremost, an apparatus similar to that above described is to be attached to each end of the cars.

Figure 4:
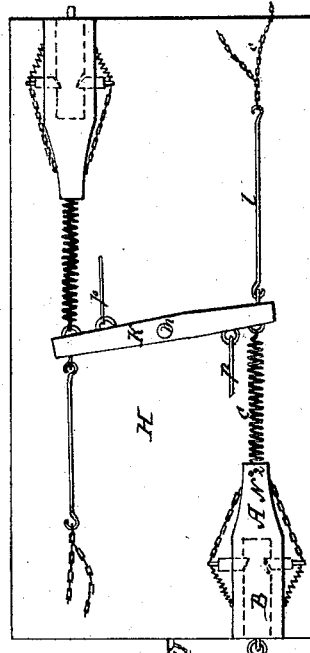
Figure 4:
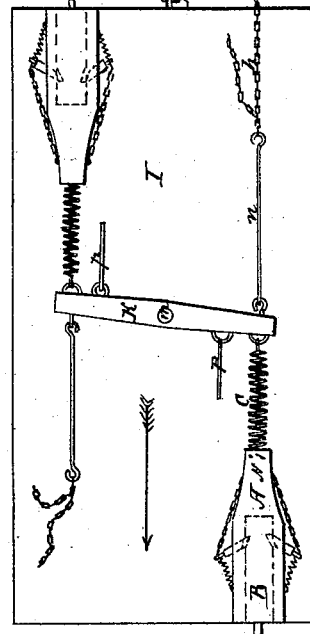

In Fig. 4 is seen a plan of the undersides of two cars of a train with my brake apparatus attached thereto, showing the manner in which the checking of the speed of the hindmost car applies the brakes of the car next in advance.

In the drawings H is the rear car and I the one next to it in the train; these cars are drawn by the ordinary coupling as at $h$. Each car is supplied with two of my brake bolts, one at each end, that they may be operated when the car is running either end foremost, but only one series or those on one side of the train are connected from each car to the next one. One of the blocks A is secured to the underside of the foremost car body at its front end. This I will call No. 1. Its spiral C is fastened at the outer end to a lever K pivoted at $m$ to the car body. To the ends of this lever opposite where the spiral C is fastened is attached a rod $n$, which is continued in a chain $b$, which is connected when the cars are coupled to the bolt B in block No. 2, secured on the front end of the rear car; the spiral C of this block is attached to one end of a lever similar to the first, and pivoted to the bottom of this car. A rod $l$ is attached to the end of this lever and is continued in a chain $c$, which is wound up on the brake windlass on the rear platform of the last car. The other series of apparatus on the other side of the cars are connected in a similar manner to the other ends of the levers K except that their chains are not coupled from one car to the next. Attached to the levers K, on each side of the pivot $m$, are rods $p$, which are fastened to the ordinary brake levers. Suppose the train to be moving in the direction of the arrow Fig. 4 the brakes being off, the bolts B will be free as in Fig. 1, to slide in and out in the blocks A, and as the cars separate from each other the bolts will draw out and the cars will be drawn by the ordinary coupling. When the engineer desires to stop his train he checks the speed of his engine which causes the cars to close up as in Fig. 4 slacking the coupling $h$, and sounds the signal to apply brakes. As soon as they have thus closed up and the bolt B is drawn back into its block by its spring, the brakeman on the rear platform of the last car winds up his brake windlass, retracting the chain $c$, the rod $l$ and the spiral C, of block No. 2. This vibrates the lever K. and applies the brakes of this car; the retraction of the spiral C, as before explained locks the bolt B, so that it can not draw out of its block. Now as the brakes have been applied to this car it is retarded, which causes it to separate from the preceding car, and the bolt B being locked in No. 2, so that it can not draw out, the chain $b$ is necessarily retracted by the holding back of the rear car and through the connection of the rod $n$, the lever K of the next preceding car is vibrated, applying its brakes and locking the bolt of No. 1. Then as this car is retarded by its brakes it separates from the next one in advance and applies its brakes; and in a similar manner the brakes are all applied almost immediately throughout the whole train, thus requiring but one brakeman to the longest trains.

This arrangement does not preclude the application of the brakes by the use of the ordinary brake windlass as a supplementary chain may connect it with the lever K, by vibrating which the brakes are applied. Besides the advantage of only requiring one brakeman to a train, it is evident that the greater the momentum of the train when one car is checked in its speed, the harder will the brakes be applied to the next one; and as the brakes are applied to all the wheels of the train so nearly at the same time it will not require so great a pressure to be put upon any of them as if the brakes were applied upon but one or two cars of a long train.

What I claim as my invention and desire to secure by Letters Patent is—

The apparatus herein described for the purpose of applying railroad car brakes consisting essentially of the sliding bolt B and the dogs E or their equivalents operating in the manner substantially as set forth.

IRA J. WEBBER.

Witnesses:
   SAM. COOPER,
   THOS. R. ROACH.